US012594601B2

(12) United States Patent
El Ouazzani Tayibi et al.

(10) Patent No.: US 12,594,601 B2
(45) Date of Patent: *Apr. 7, 2026

(54) MODULE FOR SUPPLYING ADDITIVE MANUFACTURING POWDER ALLOWING THE TRANSFER OF POWDER INTO A CONTAINER UNDER AN INERT ATMOSPHERE

(71) Applicant: AddUp, Cebazat (FR)

(72) Inventors: Ali El Ouazzani Tayibi, Cebazat (FR); Ludovic Angele, Cebazat (FR)

(73) Assignee: ADDUP, Cebazat (FR)

( * ) Notice: Subject to any disclaimer, the term of this patent is extended or adjusted under 35 U.S.C. 154(b) by 36 days.

This patent is subject to a terminal disclaimer.

(21) Appl. No.: 17/777,863

(22) PCT Filed: Nov. 17, 2020

(86) PCT No.: PCT/FR2020/052103
§ 371 (c)(1),
(2) Date: May 18, 2022

(87) PCT Pub. No.: WO2021/099732
PCT Pub. Date: May 27, 2021

(65) Prior Publication Data
US 2022/0410479 A1      Dec. 29, 2022

(30) Foreign Application Priority Data
Nov. 18, 2019      (FR) ...................................... 1912853

(51) Int. Cl.
*B22F 10/73*        (2021.01)
*B22F 10/28*        (2021.01)
(Continued)

(52) U.S. Cl.
CPC .............. *B22F 10/73* (2021.01); *B22F 12/52* (2021.01); *B22F 12/80* (2021.01); *B29C 64/329* (2017.08);
(Continued)

(58) Field of Classification Search
CPC ... B29C 64/329; B29C 64/343; B29C 64/357; B22F 10/73; B22F 10/77; B22F 12/38; B22F 12/80; B22F 12/90
See application file for complete search history.

(56) References Cited

U.S. PATENT DOCUMENTS 10,773,306 B2      9/2020   Nicaise
10,960,467 B2      3/2021   Golz et al.
(Continued)

FOREIGN PATENT DOCUMENTS

CN      100579689 C    *   1/2010   ............ B22F 1/0044
CN      204413155 U        6/2015
(Continued)

OTHER PUBLICATIONS

Machine Translation of CN100579689C (Year: 2010).*
(Continued)

*Primary Examiner* — Galen H Hauth
*Assistant Examiner* — Ariella Machness
(74) *Attorney, Agent, or Firm* — VENABLE LLP

(57)        ABSTRACT

A provision module (2) for providing additive manufacturing powder comprises: a main hopper (29) for storing additive manufacturing powder, the main hopper (29) being designed to be connected to a manufacturing module (4) configured to additively manufacture an object from the powder located in the main hopper (29); an inlet (211) of the provision module (2) designed to be connected to the manufacturing module (4) and to receive powder located in the manufacturing module (4); a glovebox (25) designed to (Continued)

receive a container (58), the glovebox (25) being able to be closed in a sealed manner; a supply circuit configured to transfer powder located in the glovebox (25) to the main hopper (29); and an extraction circuit that is different from the supply circuit and is configured to transfer additive manufacturing powder from the inlet (211) of the provision module (2) to the container (58).

10 Claims, 2 Drawing Sheets

(51) Int. Cl.

| | |
|---|---|
| *B22F 10/32* | (2021.01) |
| *B22F 10/77* | (2021.01) |
| *B22F 12/00* | (2021.01) |
| *B22F 12/52* | (2021.01) |
| *B22F 12/80* | (2021.01) |
| *B22F 12/90* | (2021.01) |
| *B29C 64/329* | (2017.01) |
| *B29C 64/343* | (2017.01) |
| *B29C 64/357* | (2017.01) |
| *B33Y 30/00* | (2015.01) |
| *B33Y 40/00* | (2020.01) |

(52) U.S. Cl.
CPC ............ *B29C 64/357* (2017.08); *B33Y 30/00* (2014.12); *B33Y 40/00* (2014.12); *B22F 10/28* (2021.01); *B22F 10/32* (2021.01); *B22F 10/77* (2021.01); *B22F 12/38* (2021.01); *B22F 12/90* (2021.01); *B29C 64/343* (2017.08)

(56) References Cited

U.S. PATENT DOCUMENTS

| | | | |
|---|---|---|---|
| 11,040,400 B2 | 6/2021 | Effernelli et al. | |
| 2017/0028468 A1* | 2/2017 | Dellea ..................... | B22F 10/28 |

| | | | |
|---|---|---|---|
| 2018/0021855 A1 | 1/2018 | De Lajudie et al. | |
| 2019/0001413 A1 | 1/2019 | Golz et al. | |
| 2019/0009334 A1 | 1/2019 | Effernelli et al. | |
| 2019/0009336 A1 | 1/2019 | Nicaise | |
| 2019/0126346 A1* | 5/2019 | Graichen ................ | B22F 3/003 |
| 2021/0069987 A1 | 3/2021 | Roman et al. | |
| 2021/0121916 A1* | 4/2021 | Charlebois ............. | B65G 53/66 |
| 2021/0162507 A1 | 6/2021 | Eyermann et al. | |
| 2021/0291448 A1* | 9/2021 | Swier .................... | B29C 64/357 |
| 2021/0394241 A1 | 12/2021 | Radermacher et al. | |
| 2022/0402037 A1 | 12/2022 | Blaser et al. | |
| 2022/0410259 A1 | 12/2022 | El Ouazzani Tayibi | |

FOREIGN PATENT DOCUMENTS

| | | | |
|---|---|---|---|
| CN | 108367353 A | 8/2018 | |
| CN | 108438316 A | 8/2018 | |
| CN | 108971492 A | 12/2018 | |
| CN | 109153145 A | 1/2019 | |
| CN | 109803776 A | 5/2019 | |
| CN | 110202789 A | 9/2019 | |
| DE | 10 2015 010 390 A1 | 2/2017 | |
| EP | 3539695 A1 | 9/2019 | |
| FR | 299315 A1 | 1/2014 | |
| JP | 2018-103462 A | 7/2018 | |
| WO | 2017/194387 A1 | 11/2017 | |
| WO | 2018/087087 A1 | 5/2018 | |
| WO | 2019/070277 A1 | 4/2019 | |

OTHER PUBLICATIONS

International Search Report dated Jan. 19, 2021, in corresponding PCT/FR2020/052103 (4 pages).
Office Action issued Jun. 19, 2024, in counterpart application CN 202080080323.X (21 pages).

* cited by examiner

MODULE FOR SUPPLYING ADDITIVE MANUFACTURING POWDER ALLOWING THE TRANSFER OF POWDER INTO A CONTAINER UNDER AN INERT ATMOSPHERE

FIELD OF THE INVENTION

The present invention relates to the general field of additive manufacturing devices and more particularly to the field of modules for filling the additive manufacturing devices with powder under a protective atmosphere.

PRIOR ART

Selective additive manufacturing consists in creating three-dimensional objects by consolidating selected areas in successive layers of pulverulent material (metal powder, ceramic powder, etc.).

Conventionally, the additive manufacturing device is filled with the additive manufacturing powder under an inert and controlled atmosphere in particular so as to protect the operator from possible inhalation or a possible explosion in the case of a reactive powder.

To that end, an additive manufacturing device usually comprises a powder-filling module with a glovebox. Containers or pots in which the powder is packaged are placed in the housing and then opened manually by the operator once an atmosphere has been created inside the housing.

Conventionally, an additive manufacturing device also comprises a powder storage and provision module connected to the filling module. The powder is transferred from the filling module to the storage and provision module, where it is sieved and then placed into a buffer hopper pending its use.

The additive manufacturing device also comprises a manufacturing module connected to the storage and provision module. The powder is transferred from the buffer hopper to the manufacturing module, where it is spread in a layer and then consolidated so as to manufacture a three-dimensional object.

After the object has been manufactured, the buffer hopper can contain a certain residual amount of unused powder.

If it is necessary to produce the next object to be manufactured from a powder of a different composition or from a powder of the same composition but coming from another powder manufacturing batch, the unused powder must be removed from the buffer hopper.

Currently, autonomous aspiration units are used to discharge the unused powder from an additive manufacturing device. These units do not make it possible to repackage the unused powder in containers in small enough amounts to be moved easily. In particular, it is not possible to fill easily transportable containers with the unused powder under an inert atmosphere.

SUMMARY OF THE INVENTION

An object of the invention is to provide an additive manufacturing device which makes it possible to package the unused powder in small portions and under a protective atmosphere.

The object is achieved within the context of the present invention by virtue of a module for providing additive manufacturing powder, comprising
a main hopper for storing additive manufacturing powder, the main hopper being designed to be connected to a manufacturing module configured to additively manufacture an object from the powder located in the main hopper,
an inlet of the provision module, which inlet is designed to be connected to the manufacturing module and to receive powder located in the manufacturing module,
a glovebox designed to receive a container, the glovebox being able to be closed in a sealed manner,
a supply circuit configured to transfer powder located in the glovebox to the main hopper,
an extraction circuit that is different from the supply circuit and is configured to transfer additive manufacturing powder from the inlet of the provision module to the container, when the container is received in the glovebox, the glovebox comprising gloves for closing the container once it has been filled with powder, while the glovebox is closed.

The return circuit and the presence of the housing make it possible to move powder into an empty container placed in the housing. In this way, the unused powder can be repotted.

Such a provision module is advantageously supplemented by the following various features or steps considered on their own or in combination:
the glovebox comprises a door between the glovebox and the main hopper, which door is movable between a first position in which the supply circuit is open between the glovebox and the main hopper, and a second position in which the supply circuit is closed and the glovebox is separated in a sealed manner from the main hopper;
a reservoir connected to the main hopper, which reservoir is located below the main hopper and comprises an outlet designed to be connected to the manufacturing module by a manufacturing duct,
a return circuit configured to redirect additive manufacturing powder located in the reservoir to the inlet of the provision module,
the circulation-inducing system being designed to suck in powder from the outlet of the reservoir to the inlet of the provision module;
the extraction circuit comprises a diverter, the provision module further comprising a bypass circuit that connects the diverter to the reservoir and is designed to transfer powder directly from the diverter to the reservoir, it being possible to configure the diverter in
an extraction configuration, in which additive powder coming from the inlet of the provision module is redirected selectively to the glovebox,
a loopback configuration, in which additive powder coming from the inlet of the provision module is redirected selectively into the bypass circuit.

The invention also relates to an additive manufacturing device comprising a module for providing additive manufacturing powder as set out above, and
a manufacturing module configured to additively manufacture an object from powder located in the main hopper, the main hopper being connected to the manufacturing module and the inlet of the provision module being connected to the manufacturing module.

Advantageously, but optionally, the device may be supplemented by a recovery system for recovering powder that is not consolidated when the object is being additively manufactured and for redirecting the powder recovered to the inlet of the provision module.

The invention also relates to a method for repotting additive manufacturing powder using a provision module or using an additive manufacturing device, as were set out above, comprising the following steps:

inserting an empty container into the glovebox, and then closing the glovebox in a sealed manner, once the container has been filled with additive manufacturing powder transferred from the inlet of the provision module, handling the container so as to close the container, while the glovebox is closed.

Such a method is advantageously supplemented by the following various steps considered on their own or in combination:

a step of conveying the powder from the reservoir to the inlet of the provision module;

a step of conveying the powder from the recovery system to the inlet of the provision module;

a preliminary powder sieving step.

DESCRIPTION OF THE FIGURES

Further features and advantages of the invention will become more apparent from the following description, which is purely illustrative and non-limiting and should be read in conjunction with the appended drawings, in which.

DETAILED DESCRIPTION OF THE INVENTION

Figure 1:
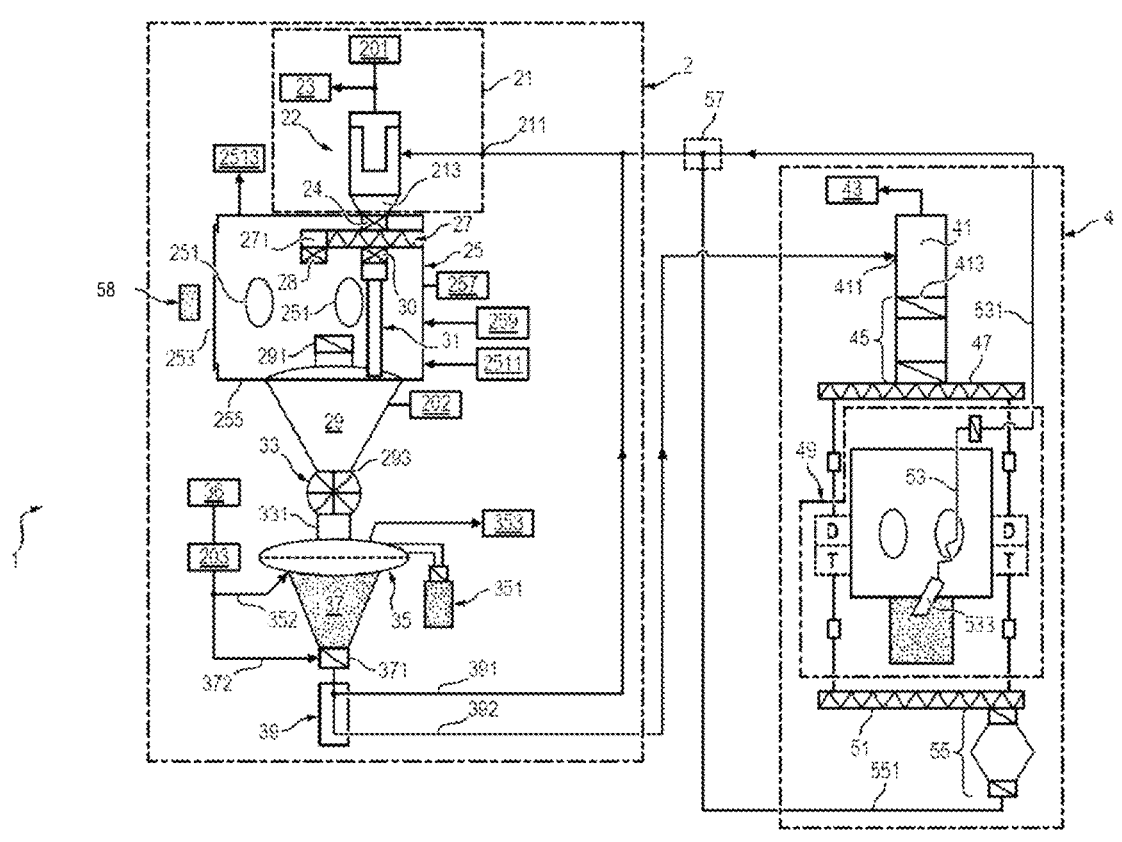
FIG. 1 is a schematic representation of an additive manufacturing device according to one embodiment of the invention.
Figure 2:
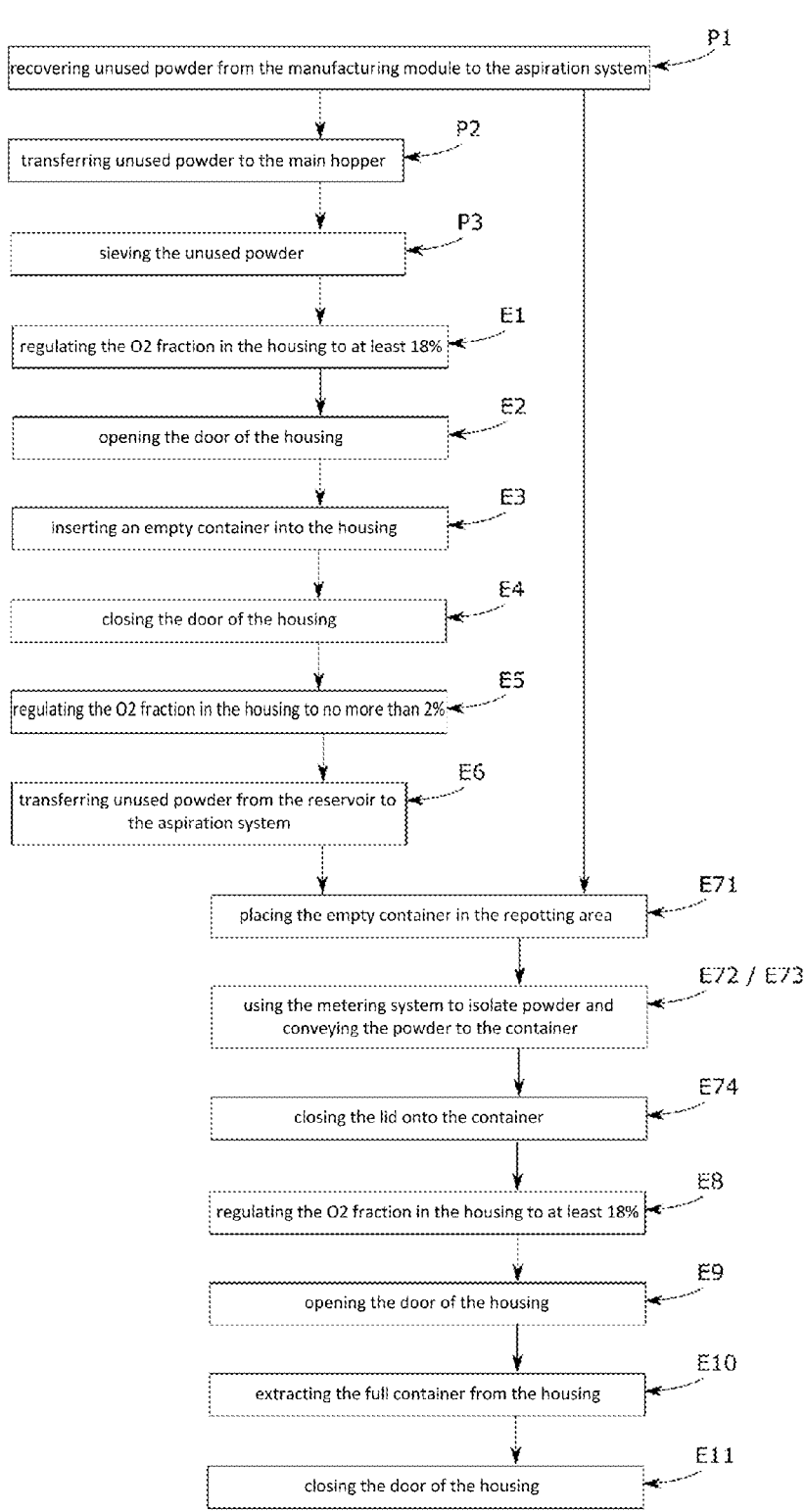
FIG. 2 is a schematic representation of a method for repotting additive manufacturing powder according to one embodiment of the invention.

FIG. 1 shows an additive manufacturing device 1 comprising a powder providing module 2 and a manufacturing module 4.

Provision Module

In its upper part, the provision module 2 comprises an aspiration system 21 connected to a first gas discharging circuit 23. The aspiration system 21 has an inlet 211 and an outlet 213 that is located at the bottom of the aspiration system 21. The aspiration system 21 is designed to generate a suction force at the inlet 211 that is directed towards the inside of the aspiration system 21. The first gas discharging circuit 23 may comprise a vacuum pump for generating the suction force. The aspiration system 21 is designed to receive additive manufacturing powder from the inlet 211 and to store it. The stored powder is located at the bottom of the aspiration system 21 and can be extracted via the outlet 213. The aspiration system 21 may comprise a powder filter so that the powder does not enter the first discharging circuit 23. The aspiration system 21 comprises a device which makes it possible to separate the powder from the gas, such as for example a cyclofilter 22. Other devices exist for separating the powder from the gas, such as a filter chamber comprising filters, a cyclone or a discharge box.

The provision module 2 comprises a housing 25 located below the aspiration system 21. The housing 25 comprises various walls that define a chamber. The housing 25 may be closed such that the chamber is a volume that is hermetically sealed with respect to the outside of the device. The housing is designed such that objects located inside the housing can be moved and handled. In particular, the housing comprises instruments for moving and handling objects inside the chamber while the chamber is closed.

The housing 25 may in particular be a glovebox. In this case, the housing has two orifices in which gloves 251 are provided such that the tightness of the housing is preserved. The gloves 251 are instruments for moving and handling objects inside the chamber while the chamber is closed. By putting on the gloves 251, an operator can handle objects located inside the glovebox 25 from outside the glovebox. A wall of the glovebox may be transparent in order to allow the operator to observe the objects to be handled.

In particular, the objects may be containers or pots 58 designed to contain additive manufacturing powder. The containers and the pots may be closed by lids.

The instruments of the housing are designed to move and close containers or pots 58 inside the chamber while the chamber is closed.

One of the walls of the housing 25 has a first door 253. The first door 253 is movable between an open position, in which a container can be moved from outside the device into the chamber or from the chamber to the outside of the device, and a closed position, in which the chamber is separated from the outside of the device in a sealed manner. The first door 253 can be closed in such a way that the housing is hermetically separated from the outside. It is also possible to move lids in or out so as to close the containers or the pots.

The housing 25 may comprise a transit area 255 within which one or more containers can be stored and stacked.

The housing 25 may comprise an oxygen sensor 257. The sensor 257 is designed to measure the oxygen fraction inside the housing.

The housing 25 may comprise a supply circuit 259 for supplying air and a supply circuit 2511 for supplying inert gas. The inert gas may in particular be dinitrogen or argon.

The housing 25 may comprise a second gas discharging circuit 2513 which may comprise a vacuum pump for generating the suction force.

The assembly of the supply circuit 259 for supplying air, the supply circuit 2511 for supplying inert gas and the second gas discharging circuit 2513 defines a gas stream control system which makes it possible to control the oxygen fraction and the inert gas fraction in the chamber.

The provision module 2 comprises a metering system 27 located below the aspiration system 21. The metering system 27 is connected to the outlet 213 of the aspiration system 21. The powder that is stored in the aspiration system 21 and is located at the bottom of the aspiration system 21 can be extracted via the outlet 213 towards the metering system 27.

A valve 24 is located between the aspiration system 21 and the metering system 27. The valve 24 in the open configuration allows the passage of powder and the valve 24 in the closed configuration makes it possible to separate the aspiration system 21 from the metering system 27 in a sealed manner. When the aspiration system 21 sucks in powder, the valve 24 is closed such that the aspiration takes place only at the inlet 211 and is directed towards the inside of the aspiration system 21. The closure of the valve 24 may be automatically triggered by starting up the aspiration of powder in the aspiration system 21.

The metering system 27 makes it possible to isolate an exact amount of powder from the powder stored in the metering system. This exact amount can be delivered to an outlet 271 of the metering system 27. The outlet 271 is located inside the housing 25 and has a valve 28. The valve 28 in the open configuration allows the passage of powder from the metering system 27 towards the inside of the housing 25 and the valve 28 in the closed configuration makes it possible to separate the metering system 27 from the inside of the housing 25 in a sealed manner.

The valve 28 is in particular closed when the first door 253 of the housing 25 is in the open position.

The metering system may be a metering screw, for example. The metering screw is incorporated in a barrel that extends in a direction which is conventionally a horizontal direction. When the screw is set in motion and powder is poured from the aspiration system 21 into the metering system 27 through the open valve 24, the powder is conveyed to the outlet 271 by the screw in the direction of extent of the barrel.

The metering system may also be an air lock comprising two valves. The air lock has a predetermined volume, and makes it possible to isolate an exact volume of powder when it is filled with powder through the first valve located on the side of the aspiration system 21. The volume of powder can then be transferred to the housing 25 via the second valve located on the side of the housing 25.

The housing 25 may comprise a repotting area designed to receive a container of powder below the outlet 271 of the metering system 27 on the inside of the housing 25.

The provision module 2 comprises a main hopper 29 which is located below the housing 25. The main hopper 29 is a receptacle that makes it possible to store additive manufacturing powder.

The main hopper 29 has a volume which has a frustoconical shape and is designed for storing a large amount of manufacturing powder. The main hopper 29 is oriented such that the axis of the frustoconical shape is vertical and the volume of the frustoconical shape has a smaller horizontal section at the bottom of the hopper. The main hopper 29 has an outlet 293 located at the bottom of the main hopper.

The housing 25 comprises a second door 291 arranged between the chamber and the main hopper 29, movable between an open position, in which the powder located in the chamber can be transferred to the main hopper 29, and a closed position, in which the chamber is separated from the main hopper 29 in a sealed manner.

The second door 291 or isolation door 291 is for example an isolation valve 291. The second door 291 defines a passage between the housing and the main hopper that can be opened or closed hermetically in a controlled manner. The passage may be oriented vertically and wide enough for an operator to be able to evacuate the contents of a pot of powder from the housing 25 into the main hopper 29.

The provision module 2 comprises a diverter. The diverter comprises one inlet and two outlets.

The inlet of the diverter is the inlet of the metering system 27 and is connected to the outlet 213 of the aspiration system 21. The first outlet of the diverter is the outlet 271 of the metering system 27.

The second outlet of the diverter passes through the metering system 27 in a vertical direction. The second outlet may be in the continuation of the direction in which the powder poured from the aspiration system 21 arrives in the metering system 27. The second outlet is connected to a bypass circuit 31. The bypass circuit 31 directly connects the second outlet of the diverter and the main hopper 29. The bypass channel 31 may be oriented vertically and pass through the glovebox. The powder passing through the bypass circuit 31 does not reach any wall of the housing 25 and is not in direct contact with the atmosphere of the housing 25. In particular, if the valve 28 is closed, the powder passing through the bypass circuit 31 is not in contact with the atmosphere of the housing 25.

The second outlet is controlled by a valve 30. The valve 30 in the open configuration allows the passage of powder from the metering system 27 towards the bypass channel 31 and the valve 30 in the closed configuration prevents the passage of powder from the metering system 27 towards the bypass channel 31.

It is possible to configure the diverter in an extraction configuration, in which powder at the outlet of the metering system is directed selectively towards the glovebox 25. In this configuration, the valve 30 is in the closed configuration, and the metering screw is set in operation so as to convey powder to the outlet 271 of the metering system.

It is possible to configure the diverter in a loopback configuration, in which powder at the outlet of the metering system 21 is directed selectively towards the second outlet of the diverter. In this configuration, the valve 30 is in the open configuration, and the metering screw is at a standstill.

The diverter can therefore be considered to be formed by the metering system 27 and the valve 30.

The provision module 2 comprises a metering device 33, located below the main hopper 29. The metering device 33 makes it possible to regulate the flow rate of powder sent to the sieve 35 in order to not damage a screen contained inside the sieve 35. The metering device 33 is connected to the outlet 293 of the main hopper. The metering device 33 has an outlet 331 located at the bottom of the metering device 33.

The provision module 2 comprises a sieve 35, located below the metering device 33. The sieve 35 is connected to the outlet 331 of the metering device 33. The sieve makes it possible to filter the agglomerated masses of powder and to isolate them from the rest of the powder within a receptacle 351. The sieve comprises a third discharging circuit 353 which may comprise a vacuum pump for generating the suction force.

The provision module 2 comprises a reservoir 37 located below the sieve 35. The reservoir 37 may be a hopper having a volume which has a frustoconical shape designed for storing a large amount of manufacturing powder. This hopper may be oriented such that the axis of the frustoconical shape is vertical and the volume of the frustoconical shape has a smaller horizontal section at the bottom of the hopper. The reservoir 37 has an outlet 371 located at the bottom of the reservoir.

It is possible to transfer powder from the glovebox 25 to the reservoir 37 when the second door 291 is in the open position. The powder can then pass successively from the glovebox 25 to the main hopper 29, to the metering device 33, to the sieve 35 and then finally to the reservoir 37. In this way, it is possible to define a supply circuit configured to transfer powder located in the glovebox 25 to the main hopper 29 or, further along, the reservoir 37. The second door 291 which defines a passage between the housing and the main hopper that can be opened or closed hermetically in a controlled manner can open or close the supply circuit.

The provision module 2 comprises a dry inert gas feed system 36. The feed system 36 can provide a stream of dry inert gas in a duct 352 connected to the sieve 35. The stream of dry inert gas passing through the duct 352 is oriented from the bottom upward so as to encounter powder passing through the sieve from the bottom upward. The stream of inert gas arriving in the sieve 35 via the duct 352 also diffuses into the upper part of the reservoir 37.

The duct 352 and the third discharging circuit 353 may be aligned in one and the same direction, such that a stream of inert gas, in one and the same direction, can pass successively through the duct 352, encounter powder passing through the sieve and finally pass through the third discharging circuit 353.

The feed system 36 can also provide a stream of dry inert gas in a duct 372 connected to the bottom of the reservoir 37, for example to the outlet 371.

The outlet 371 of the reservoir is connected to a return circuit 391. The return circuit 391 connects the outlet 371 of the reservoir 37 and the inlet 211 of the aspiration system 21. The return circuit 391 connects the outlet 371 of the reservoir 37 and the housing 25. It is possible to transport powder from the reservoir 37 towards the housing 25 of the powder via the aspiration system 21. The aspiration system 21 can suck in the powder from the reservoir 37 towards the aspiration system 21 through the return circuit 391.

The outlet 371 of the reservoir is also connected to a manufacturing duct 392. The manufacturing duct 392 connects the outlet 371 of the reservoir 37 and the manufacturing module 4, such that powder contained in the reservoir 37 can be transferred to the manufacturing module 4.

The sieve 35 is located just above the reservoir 37 such that the powder contained in the reservoir 37 and transferred to the manufacturing module 4 is sieved as late as possible before it is sent to the manufacturing module 4.

The reservoir 37 may have a smaller volume than the main hopper 29. The role of the reservoir 37 is to store the powder just before it is transported either to the manufacturing module 4 or to the aspiration system 21. The reservoir 37 can be referred to as a buffer hopper.

The main hopper 29 is designed to contain a large portion of the manufacturing powder required to additively manufacture one or more three-dimensional objects. The powder contained in the main hopper 29 is intended to be transferred to the manufacturing module 4. To that end, the main hopper 29 is designed to be connected to the manufacturing module 4 configured to additively manufacture an object from the powder located in the main hopper 29. The main hopper 29 is connected to the manufacturing module by way of the circulation of powder passing through the metering device 33, the sieve 35, the reservoir or buffer hopper 37 and lastly the manufacturing duct 392.

The provision module 2 comprises a controller 39 which allows the powder to be diverted from the outlet 371 to the return circuit 391 or to the manufacturing duct 392.

The provision module 2 may comprise a moisture sensor 201 located on the first gas discharging circuit 23. This moisture sensor 201 makes it possible to know the humidity level of the gases discharged by the aspiration system 21, that is to say the humidity level upstream of the inlet 211 of the aspiration system 21.

The provision module 2 may comprise a moisture sensor 202 located on an upper part of the main hopper 29. This moisture sensor 202 makes it possible to know the humidity level in the main hopper 29 and to provide information directly regarding the humidity level of a powder possibly present in the main hopper 29.

The provision module 2 may comprise a moisture sensor 203 connected to the dry inert gas feed system 36. This moisture sensor 203 makes it possible to know the humidity level of the dry inert gas sent to the sieve 35 or the reservoir 37.

The provision module 2 comprises a circulation-inducing system comprising the aspiration system 21.

The aspiration system 21 can suck in the powder from the reservoir 37 towards the aspiration system 21 through the return circuit 391.

Manufacturing Module

In its upper part, the manufacturing module 4 comprises a second aspiration system 41 connected to a fourth gas discharging circuit 43. The second aspiration system 41 has an inlet 411 and an outlet 413 that is located at the bottom of the second aspiration system 41. The second aspiration system 41 is designed to generate a suction force at the inlet 411 that is directed towards the inside of the second aspiration system 41. The inlet 411 of the second aspiration system 41 is connected to the manufacturing duct 392. The fourth gas discharging circuit 43 may comprise a vacuum pump for generating the suction force. The aspiration system 41 may comprise a powder filter so that the powder does not enter the fourth gas discharging circuit 43. The second aspiration system 41 comprises a device which makes it possible to separate the powder from the gas, such as for example a cyclone. Other devices exist for separating the powder from the gas, such as a filter chamber comprising filters, a cyclofilter or a discharge box. The second aspiration system 41 is designed to receive additive manufacturing powder from the inlet 411 and to store it. The stored powder is located at the bottom of the second aspiration system 41 and can be extracted via the outlet 413.

The manufacturing module 4 comprises an air lock 45 located below the second aspiration system 41. The air lock 45 makes it possible to transfer powder without the printer chamber ever being in communication with the second aspiration system 41 so as to avoid disrupting the printing enclosure in terms of inerting and pressure.

The manufacturing module 4 comprises a divergent screw 47 and a convergent screw 51 that are located on either side of an enclosure 49 within which the three-dimensional objects are manufactured. The enclosure 49 is the printer chamber.

The manufacturing module 4 comprises a recovery system for recovering the spread and non-consolidated powder at the end of manufacture.

The recovery system may comprise an aspiration tube 53 designed to suck in powder. The aspiration tube 53 comprises an aspiration nozzle 533 which constitutes the inlet of the aspiration tube. The powder is sucked in at the nozzle and transferred to the other end of the tube which constitutes the outlet of the aspiration tube 53. The manufacturing device 1 may comprise a first recovery duct 531 which connects the outlet of the aspiration tube 53 and the inlet 211 of the aspiration system 21.

The recovery system may comprise a surplus air lock 55 designed for recovering powder coming from the convergent screw 51.

The manufacturing device 1 may comprise a second recovery duct 551 which connects the surplus air lock 55 and the inlet 211 of the aspiration system 21.

The surplus air lock 55 makes it possible to transfer powder without the printer chamber ever being in communication with the second recovery duct 551 so as to avoid disrupting the printing enclosure in terms of inerting and pressure.

The manufacturing device 1 may also comprise a second controller designed to circulate the powder in a controlled manner from the recovery system towards the aspiration system 21.

In this regard, the inlet 211 may be referred to as an inlet of the provision module 2, which inlet is designed to be connected to the manufacturing module 4 and to receive powder located in the manufacturing module 4.

It should be noted that the manufacturing device 1 comprises enough valves at the intersections of ducts 391, 392, 531 and 551 to allow the circulations of powder that are mentioned in the description.

It should also be noted that it is possible to transfer powder from the inlet 211 to the glovebox 25. The powder passes successively through the aspiration system 21, the outlet 213 of the aspiration system 21, the metering system 27, the diverter 27, 30 configured in its extraction configuration and lastly the glovebox 25. More specifically, the powder that arrives in the glovebox 25 can be poured into a container contained in the glovebox 25. In this way, an extraction circuit exists that is different from the supply circuit and is configured to transfer additive manufacturing powder from the inlet 211 of the provision module 2 to the container, when the container is received in the glovebox 25, the extraction circuit comprising the diverter 27, 30.

Filling Method

The provision module 2 makes it possible to fill and sieve the manufacturing powder according to the steps described below. Initially, the housing 25 is hermetically closed and does not contain any container; the main hopper 29 and the reservoir 37 are empty of powder. The passage between the housing and the main hopper that is defined by the second door 291 is initially hermetically closed.

During a first step S1, the oxygen fraction inside the housing is regulated so as to reach at least 18%. The oxygen sensor 257 acquires a measurement of the oxygen fraction inside the housing 25. Depending on the measurement, the air supply circuit 259 is activated so as to increase the oxygen fraction. The gas discharging circuit 2513 is activated so as to substantially maintain the atmospheric pressure in the housing 25. The oxygen sensor 257 makes it possible to ensure that the oxygen fraction is at least 18% in the housing.

During a second step S2, the door 253 of the housing 25 is opened and a container of powder is inserted or multiple containers of powder are inserted into the housing 25. The containers may be placed in the transit area 255 of the housing 25.

During a third step S3, the door 253 of the housing 25 is closed and the oxygen fraction in the housing is regulated to no more than 2%. The inert gas supply circuit 2511 is activated so as to decrease the oxygen fraction. The gas discharging circuit 2513 is activated so as to substantially maintain the atmospheric pressure in the housing 25. The reduction of the oxygen fraction to no more than 2% can be referred to as inerting. The oxygen sensor 257 makes it possible to ensure that the oxygen fraction is no more than 2% in the housing.

During a fourth step S4, the main hopper 29 is filled. The isolation door 291 is activated so as to open up the passage between the housing and the main hopper. The operator handles, by virtue of the instruments 251, a full container in the transit area 255 such that the container is opened and the contents of the container are poured through the passage into the main hopper 29. For example, the operator puts on the gloves of the housing 25, grabs a full container in the transit area 255, opens the container and pours the contents of the container through the passage into the main hopper 29. The operator places the empty container back in the transit area 255 and proceeds in the same way until all of the containers in the housing are empty.

During a fifth step S5, the isolation door 291 is closed so as to hermetically close the passage between the housing and the main hopper.

During a sixth step S6, the oxygen fraction inside the housing is regulated so as to reach at least 18%. The air supply circuit 259 is activated so as to increase the oxygen fraction. The gas discharging circuit 2513 is activated so as to substantially maintain the atmospheric pressure in the housing 25. The oxygen sensor 257 makes it possible to ensure that the oxygen fraction is at least 18% in the housing.

During a seventh step S7, the door 253 of the housing 25 is opened and the empty container(s) of powder are taken out of the housing 25.

During an eighth step S8, the door 253 of the housing 25 is hermetically closed.

During a ninth step S9, the powder is sieved and stored in the reservoir 37. The powder contained in the main hopper 29 is transferred to the sieve 35 through the metering device 33. The sieve 35 sieves the powder and extracts the masses of powder and the aggregates of powder that are excessively large. These masses are transferred to the receptacle 351 and are stored in the receptacle. The sieved powder passes through the sieve 35 and enters the reservoir 37 in which it is stored before use.

Repotting Method

The provision module 2 makes it possible to repot the unused manufacturing powder. The process for repotting the unused powder which is initially located in the reservoir 37 is set out below in accordance with the following steps. Initially, the housing 25 is hermetically closed and does not contain any container; the reservoir 37 contains unused powder. The passage between the housing and the main hopper that is defined by the isolation door 291 is initially hermetically closed.

It should be noted that if the unused powder is contained in the main hopper 29, it is transferred to the reservoir 37. This transfer may optionally be carried out multiple times if the volume of the reservoir 37 is not enough to contain all of the unused powder.

During a first step E1, the oxygen fraction inside the housing is regulated so as to reach at least 18%. The oxygen sensor 257 acquires a measurement of the oxygen fraction inside the housing 25. Depending on the measurement, the air supply circuit 259 is activated so as to increase the oxygen fraction. The gas discharging circuit 2513 is activated so as to substantially maintain the atmospheric pressure in the housing 25. The oxygen sensor 257 makes it possible to ensure that the oxygen fraction is at least 18% in the housing. During a second step E2, the door 253 of the housing 25 is opened.

During a third step E3, an empty container is inserted or multiple empty containers are inserted into the housing 25. The containers may be placed in the transit area 255 of the housing 25. The lids of the containers are also inserted. The containers may be brought in open. The containers may be brought in closed, in particular if they contain an inert atmosphere, that is to say with a gaseous composition of no more than 2% oxygen and at least 98% inert gas.

During a fourth step E4, the door 253 of the housing 25 is hermetically closed. During a fifth step E5, the oxygen fraction inside the housing is regulated to no more than 2%. The inert gas supply circuit 2511 is activated so as to decrease the oxygen fraction. The gas discharging circuit 2513 is activated so as to substantially maintain the atmospheric pressure in the housing 25. The oxygen sensor 257 makes it possible to ensure that the oxygen fraction is no more than 2% in the housing.

During a sixth step E6, the unused powder is transported from the reservoir 37 or the main hopper 29 to the aspiration system 21. The controller 39 is activated such that the outlet 371 of the reservoir is connected to the return circuit 391.

The inert gas supply circuit 372 connected at the top of the reservoir and at the bottom of the reservoir is activated so as to drive the unused powder into the return circuit 391. The aspiration system 21 is activated so as to generate a suction force at the inlet 211 that is directed towards the inside of the aspiration system 21. This setting in motion can be done in accordance with the various possible transport modes: dense phase mode, dilute phase mode, etc.

The powder concentration in the circulation ducts and the speed of the gas stream can be controlled for this purpose.

During a seventh step E7, a sequence of sub-steps is performed.

This sequence is performed by way of the diverter, which is configured in the extraction configuration.

During a first sub-step E71, an empty container is moved from the transit area 255 to the repotting area underneath the metering system.

During a second sub-step E72, the metering system 27 is actuated so as to isolate an amount of powder from the powder stored in the aspiration system 21. This amount is less than or equal to a maximum capacity of the container. During a third sub-step E73, the metering system is actuated so as to extract the powder. The position of the container makes it possible for the powder to then enter the container.

During a fourth sub-step E74, the container and its lid are handled using instruments 251 so as to close the container by way of the lid. The operator closes the container by way of the lid and places the filled container in the transition area.

The sequence of sub-steps is resumed if unused powder remains in the aspiration system and if an empty container remains in the transition area. If the two conditions are met then the sequence is resumed and the sub-steps E71, E72, E73 and E74 are performed with a new empty container. Otherwise, the sequence is interrupted and an eighth step E8 is performed.

During the eighth step E8, the oxygen fraction inside the housing is regulated so as to reach at least 18%. The air supply circuit 259 is activated so as to increase the oxygen fraction. The gas discharging circuit 2513 is activated so as to substantially maintain the atmospheric pressure in the housing 25. The oxygen sensor 257 makes it possible to ensure that the oxygen fraction is at least 18% in the housing.

During a ninth step E9, the door 253 of the housing 25 is opened.

During a tenth step E10, the filled and closed container or the filled and closed containers is/are extracted from the housing 25.

During an eleventh step E11, the door of the housing is hermetically closed.

The provision module 2 comprises both a housing 25 which makes it possible to fill the main hopper 29 with containers of powder and an aspiration system 21, a metering system 27, a main hopper, a powder metering device 33, a powder sieve 35 and a reservoir 37.

If there is still powder stored in the reservoir 37 when the manufacturing process is completed, the unused powder can be transported to the aspiration system 21 via the return circuit 391.

The presence of the housing located downstream of the metering system then makes it possible to transport the unused powder from the aspiration system 21 to empty containers placed in the housing. It is possible to repot unused powder.

The unused powder may be repackaged in smaller portions than in the prior art. The portions, like the powder containers, are light enough to be handled and moved by an operator. This repackaging may be carried out under a protective atmosphere by virtue of the housing.

It should be noted that the metering system 27 and the bypass duct 31 allow the powder to circulate from the aspiration system either to the housing 25 or to the main hopper 29. In this way, it is possible, as in the prior art, to resieve unused powder coming from the manufacturing module 4 before it is reused, without repotting. This is because it is possible for the aspiration system 21 to suck in the unused powder and then for said powder to be moved directly into the main hopper 29 via the bypass conduit 31. The unused powder can then be sieved and stored in the reservoir 37.

Method for Repotting Powder Coming from the Manufacturing Module

In the repotting method which has just been set out, the unused powder is initially located in the reservoir 37 or the main hopper 29.

The provision module 2 also makes it possible to repot unused manufacturing powder which is initially located in the manufacturing module 4. In this case, the manufacturing powder was transferred to the manufacturing module 4, and then it was spread during the process of manufacturing a three-dimensional object. A portion of the powder which is not consolidated at the end of this process and which surrounds the manufactured objects is recovered by the recovery system via the aspiration tube 53 and another portion of the non-consolidated powder, referred to as surplus powder, is recovered via the convergent screw and the surplus air lock.

During a step P1, the unused powder is transported to the aspiration system 21. The powder is sucked in by the aspiration system 21 and passes through the first recovery duct 531 or through the second recovery duct 551.

At the end of step P1, the unused powder is contained in the aspiration system 21.

If the unused powder is to be discarded, then the repotting method continues by following steps E7 to E11 that were set out above.

If the unused powder is to be reused later, then it is desirable to resieve the unused powder before repotting it. In this case, the repotting process comprises the following steps.

During a step P2, the unused powder is moved into the main hopper 29: the diverter (27,30) is configured in the loopback configuration such that the unused powder contained in the aspiration system 21 is transported to the bypass channel 31. The unused powder then flows from the outlet 213 of the aspiration system 21 towards the main hopper 29 via the bypass channel 31.

During a step P3, the sieve 35 sieves the unused powder. The powder contained in the main hopper 29 is transferred to the sieve 35 through the metering device 33. The sieve 35 sieves the powder and extracts the masses of powder and the aggregates of powder that are excessively large. These masses are transferred to the receptacle 351 and are stored in the receptacle.

At the end of step P3, the sieved powder leaves the sieve 35 and enters the reservoir 37.

The remainder of the repotting method follows steps E1 to E11 that are already set out above.

The presence of recovery channels 531 and 551 makes it possible for the recovery system to convey non-consolidated powder recovered in the manufacturing module 2 to the aspiration system 21. This powder can then be packaged in small enough amounts to be moved by an operator, for example in containers of powder.

The presence of the housing located downstream of the metering system then makes it possible to pour the unused powder from the aspiration system 21 into empty containers placed in the housing. It is possible to repot unused powder under a protective atmosphere by virtue of the housing 25 that is placed at this location. This use makes it possible to perform repackaging under a protective atmosphere in amounts that can be transported by an operator before being discarded.

It should be noted that this powder can be resieved before repotting. By virtue of the diverter 27, 30 it is possible to transport the powder from the aspiration system 21 through the bypass duct 31 to the main hopper 29. This unused powder can then be resieved by the sieve 35. Subsequently, the unused and resieved powder is returned via the return circuit 391 to the aspiration system 21. From the aspiration system 21, this time the powder can be poured towards the housing 25 for repackaging, the diverter 27, 30 being configured in the extraction configuration. It is thus possible to repackage powder under a protective atmosphere in amounts that can be transported by an operator before storing it for possible subsequent reuse.

The invention claimed is:

1. A provision module for providing additive manufacturing powder, the provision module comprising:
 a main hopper for storing additive manufacturing powder, the main hopper being configured to be connected to a manufacturing module, the manufacturing module being configured to additively manufacture an object from powder stored in the main hopper;
 an inlet of the provision module, which inlet is designed to be connected to the manufacturing module and to receive powder located in the manufacturing module;
 a glovebox designed to receive a container, the glovebox being configured to be closed in a sealed manner, wherein the glovebox comprises gloves for closing the container once the container has been filled with powder, while the glovebox is closed;
 a supply circuit configured to transfer powder located in the glovebox to the main hopper;
 an extraction circuit that is different from the supply circuit, the extraction circuit being configured to transfer additive manufacturing powder from the inlet to the container, when the container is received in the glovebox;
 a reservoir connected to the main hopper, the reservoir being located below the main hopper to receive powder from the main hopper, the reservoir comprising an outlet, the outlet being configured to be connected to a manufacturing duct, the manufacturing duct connecting the outlet of the reservoir and the manufacturing module;
 a return circuit different from the manufacturing duct, the return circuit connecting the outlet of the reservoir and the inlet of the provision module; and
 a circulation-inducing system configured to suck in powder from the outlet of the reservoir to the inlet of the provision module.

2. The provision module according to claim 1, wherein the glovebox comprises a door between the glovebox and the main hopper, the door being movable between a first position in which the supply circuit is open between the glovebox and the main hopper, and a second position in which the supply circuit is closed and the glovebox is separated in a sealed manner from the main hopper.

3. The provision module according to claim 1, wherein the extraction circuit comprises a diverter, the provision module further comprising a bypass circuit connecting the diverter to the reservoir that is designed to transfer powder directly from the diverter to the reservoir, it being possible to configure the diverter in:
 an extraction configuration, in which additive powder coming from the inlet of the provision module is redirected selectively toward the glovebox; and
 a loopback configuration, in which additive powder coming from the inlet of the provision module is redirected selectively into the bypass circuit.

4. An additive manufacturing device comprising:
 the provision module for providing additive manufacturing powder according to claim 1; and
 the manufacturing module configured to additively manufacture an object from the powder located in the main hopper, the main hopper being connected to the manufacturing module and the inlet of the provision module being connected to the manufacturing module.

5. The additive manufacturing device according to claim 4, further comprising a recovery system for recovering unconsolidated powder when the object is being additively manufactured, the recovery system being configured to redirect the unconsolidated powder toward the inlet of the provision module.

6. A method for repotting additive manufacturing powder using the provision module according to claim 1, the method comprising the following steps:
 inserting an empty container into the glovebox, and then closing the glovebox in a sealed manner; and
 once the container has been filled with additive manufacturing powder transferred from the inlet of the provision module, handling the container so as to close the container, while the glovebox is closed.

7. The method according to claim 6 further comprising a preliminary powder sieving step.

8. A method for repotting additive manufacturing powder using the additive manufacturing device according to claim 4, the method comprising the following steps:
 inserting an empty container into the glovebox, and then closing the glovebox in a sealed manner; and
 once the container has been filled with additive manufacturing powder transferred from the inlet of the provision module, handling the container so as to close the container, while the glovebox is closed.

9. The method according to claim 8, wherein the additive manufacturing device further comprises a recovery system for recovering unconsolidated powder when the object is being additively manufactured, the recovery system being configured to redirect the unconsolidated powder toward the inlet of the provision module, and
 wherein the method further comprises a step of conveying powder from the reservoir to the inlet of the provision module.

10. The method according to claim 8 further comprising a preliminary powder sieving step.

* * * * *